United States Patent [19]

Higgins et al.

[11] Patent Number: 4,538,895
[45] Date of Patent: Sep. 3, 1985

[54] SCANNING OPTICAL SYSTEM FOR USE WITH A SEMICONDUCTOR LASER GENERATOR

[75] Inventors: Robert C. Higgins, Broomfield; Mikel J. Stanich, Louisville; Larry L. Wolfe, Broomfield, all of Colo.

[73] Assignee: International Business Machines Corporation, Armonk, N.Y.

[21] Appl. No.: 472,430

[22] Filed: Mar. 7, 1983

[51] Int. Cl.³ .............. G03G 15/04; B41B 21/08; B41B 13/00; G02B 27/30
[52] U.S. Cl. ................... 355/3 R; 355/11; 350/6.8; 358/285; 358/300
[58] Field of Search ............ 372/241, 1, 105; 350/151, 167, 181, 6.8, 6.9, 6.91, 432, 433, 434, 435, 416, 417; 355/3 R, 11; 346/160, 74.4, 74.2, 74.3, 74.5, 74.6, 74.7, 76 L; 358/285–305

[56] References Cited

U.S. PATENT DOCUMENTS

| | | | |
|---|---|---|---|
| 3,626,317 | 12/1971 | Dakss et al. | 372/101 X |
| 3,750,189 | 7/1973 | Fleischer | 346/74 ES |
| 3,995,110 | 11/1976 | Starkweather | 178/7.6 |
| 4,040,096 | 8/1977 | Starkweather | 358/302 |
| 4,056,307 | 11/1977 | Rayces | 350/433 X |
| 4,084,197 | 4/1978 | Starkweather | 358/300 |
| 4,185,891 | 1/1980 | Kaestner | 350/433 X |
| 4,203,652 | 5/1980 | Hanada | 350/182 |
| 4,253,724 | 3/1981 | Minoura et al. | 350/6.8 |
| 4,270,149 | 6/1981 | Ohta et al. | 358/293 |
| 4,293,202 | 10/1981 | Ohnishi et al. | 354/5 |
| 4,294,506 | 10/1981 | Hattori | 350/6.8 |
| 4,305,646 | 12/1981 | Bechtold | 354/5 |
| 4,329,026 | 5/1982 | Moyroud | 354/5 |
| 4,357,071 | 11/1982 | Mankel et al. | 350/6.8 |
| 4,383,755 | 5/1983 | Fedder et al. | 355/11 |

FOREIGN PATENT DOCUMENTS 2062277 5/1981 United Kingdom ............ 350/6.8

OTHER PUBLICATIONS

*Optics–The Technique of Definition,* by Arthur Cox, pp. 98–103, 120–129, Mar. 1956.
Webster's New World Dictionary of the American Language, College Edition, pp. 12, 53, 288, 1968.
IBM Technical Disclosure Bulletin, "Collimated Light Source with Laser Diode and Microcylindrical Lens," E. A. Cunningham, vol. 19, No. 2, Jul. 1976, pp. 625–626.

Primary Examiner—A. T. Grimley
Assistant Examiner—Terry Flower
Attorney, Agent, or Firm—Charles E. Rohrer

[57] ABSTRACT

An optical system for use with laser chips to counteract variations in wavelength produced by semiconductor chips, to counteract astigmatism effects common to laser chips, to counteract variations in the distance between the plane of emission of the beam and the plane of a collimating lens, to counteract variations in beam size in perpendicular planes, to counteract variations in the divergence angle of emission common to laser chips, and to counteract tilt variations caused by imperfect reflecting surfaces. The system includes an apertured achromatic doublet lens for collimating the beam, a cylindrical lens, a rotating mirror, and a combination of toroidal and spherical lens.

6 Claims, 5 Drawing Figures

SCANNING OPTICAL SYSTEM FOR USE WITH A SEMICONDUCTOR LASER GENERATOR

This invention relates to a laser scanning system and more particularly to a system designed for use with a semiconductor laser generator.

BACKGROUND OF THE INVENTION

Optical scanning systems are used in various types of machines and the invention to be described herein is to a system which can be used in many of these different machines. For illustrative purposes, the invention will be described in the context of an electrophotographic printing machine.

In electrophotographic printing machines, prints are produced by creating an electrostatic representation of the print on a photoreceptive surface, developing the image and then fusing the image to print material. In machines which utilize plain bond paper or other image receiving material not coated with photoreceptive material, the electrophotographic process is of the transfer type where photoreceptive material is placed around a rotating drum or arranged as a belt to be driven by a system of rollers. In the typical transfer process, photoreceptive material is passed under a stationary charge generating station to place a relatively uniform electrostatic charge, usually several hundred volts, across the entirety of the photoreceptive surface. Next, the photoreceptor is moved to an imaging station where it receives light rays generated by a light source. In electrophotographic printing machines such as the IBM 6670 Information Distributor, light rays are used to discharge the photoreceptive material in white or background areas to relatively low levels while areas which are desired to print out as dark areas continue to carry high voltage levels after the exposure. In that manner, the photoreceptive material is caused to bear a charge pattern which corresponds to the printing, shading, etc. which is desired.

Production of the image on the photoreceptive surface can be produced by a scanning optical beam where the desired characters are produced by driving a light generating source from information held in digital memory. The generating source may be a laser gun, an array of light-emitting diodes, light modulators, etc. which direct light rays to the photoreceptor and cause it to bear the desired charge pattern.

An example of a light scanning and printing system such as is employed in the IBM 6670 Information Distributor is disclosed in U.S. Pat. No. 3,750,189. In that system, a laser beam is directed through a collimating lens system and focused as a line on a rotating mirror. The reflected beam is passed through a combination of a toroidal and a spherical lens to focus the line image on the final image plane, that is, the photoreceptor. The shape of the focused beam on the photoreceptor is designed to be slightly elliptical in order to compensate for the different image forming properties of the optical system in the scan and non-scan directions.

The type of light source provided in the IBM 6670 Information Distributor for use with the optical system of the above-referenced patent is a helium neon generating source or a similar type source which provides a continuous laser beam modulated to carry the digital information desired for reproduction. In the current invention, an optical system is provided which is designed for use with semiconductor laser sources where significantly different problems are encountered and which require solution in order to accurately and economically produce a satisfactory image.

The special problems associated with semiconductor laser generating sources include changes in the wavelength being produced by the laser chip as the chip ages or as the chip experiences heat variations in the machine environment in which it is located. Another problem is a difference in wavelength produced from one laser chip to another. Because of these factors, the inventors herein describe an optical system which is designed to accommodate changes in wavelength produced by the chip.

Another significant problem which must be addressed is variation in the divergence angle of the laser beam which is produced by different chips and which is produced in different planes by the same chip. In addition, an optical system should provide depth of focus to eliminate various problems including astigmatism, and counteract tilt variations in the surface of the rotating mirror. The system of this invention also accommodates these factors.

SUMMARY OF THE INVENTION

The optical system of the current invention provides an achromatic doublet lens positioned adjacent to the semiconductor laser generating source together with an aperture located just after or just prior to the achromatic doublet lens. The doublet lens collimates the beam and passes it to a cylindrical lens for focusing the beam onto the surface of a rotating mirror, then through a toroidal lens together with a spherical lens to focus the beam onto a moving photoreceptive surface.

BRIEF DESCRIPTION OF THE DRAWINGS

The above-mentioned and other features and objects of this invention and the manner of attaining them will become more apparent and the invention itself will best be understood by reference to the following description of embodiments of the invention taken in conjunction with the accompanying drawings, the description of which follows.

DETAILED DESCRIPTION

Figure 1:
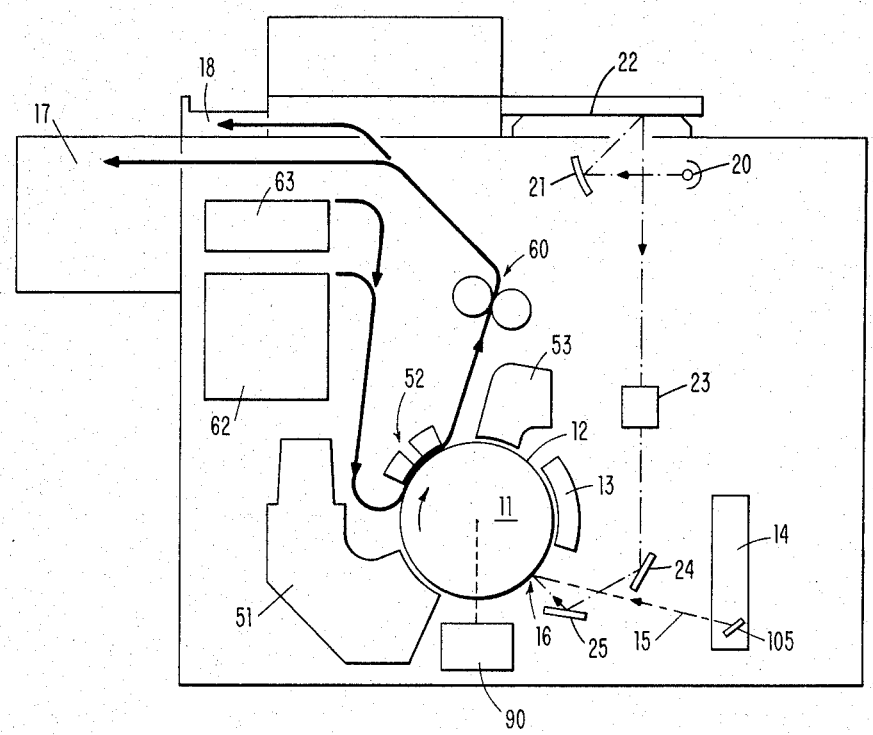
FIG. 1 illustrates the paper path of the IBM 6670 Information Distributor with the optical module of the instant invention.

An electrophotographic machine capable of using the instant invention is shown in FIG. 1. A drum 11 carries upon its surface photoreceptive material 12 which is charged by charge corona 13 to a relatively uniform charge. The optical system of the instant invention, module 14, generates a laser beam 15 which strikes the moving photoreceptive surface at exposure station 16. The latent image produced at exposure station 16 is developed by developer 51 and a transfer is made at transfer station 52 to print receiving material. Any development material continuing to reside on the surface of photoreceptor 12 after transfer is cleaned away at cleaning station 53. The process steps then repeat for the production of additional prints.

After transfer of the image to the print receiving material at transfer station 52, that material is passed through fuser rolls 60 at which the developing material is permanently bonded to the print receiving material. The print receiving material is ultimately deposited at a finishing station 17 or in an exit pocket 18. Other machine elements shown in FIG. 1 include drive motor 90, and print material bins 62 and 63. FIG. 1 also shows the elements of a copier optical system for imaging an original document when the machine is used as a copier machine instead of as a printer. The copier optical system includes a multichromatic light source 20, a reflecting mirror 21, a document glass 22 upon which a document to be copied is placed, a lens 23, and mirrors 24 and 25. In that manner, light rays produced by light source 20 strike the moving photoreceptive surface 12 at exposure station 16 to produce a latent image of the document to be copied. None of the elements of the copier optical system form a part of the invention described herein.

A common variation on the electrophotographic process shown in FIG. 1 involves the use of coated paper where the print paper itself carries a coating of photosensitive material. In that technique, the image is presented directly to the print paper. The paper is sent through a developer and then to a fuser for permanent bonding. Machines of this type avoid the residual developer problem and therefore there is no need for cleaning stations, erase lamps, preclean generating coronas, etc. However, the resulting print paper with its special photosensitive coating is more expensive than plain bond paper and special coating is considered to detract from the resulting product. As a consequence, coated paper machines are usually favored only for low volume applications or when quality products are not essential. However, the instant invention can be used in either type of machine.

Figure 2:
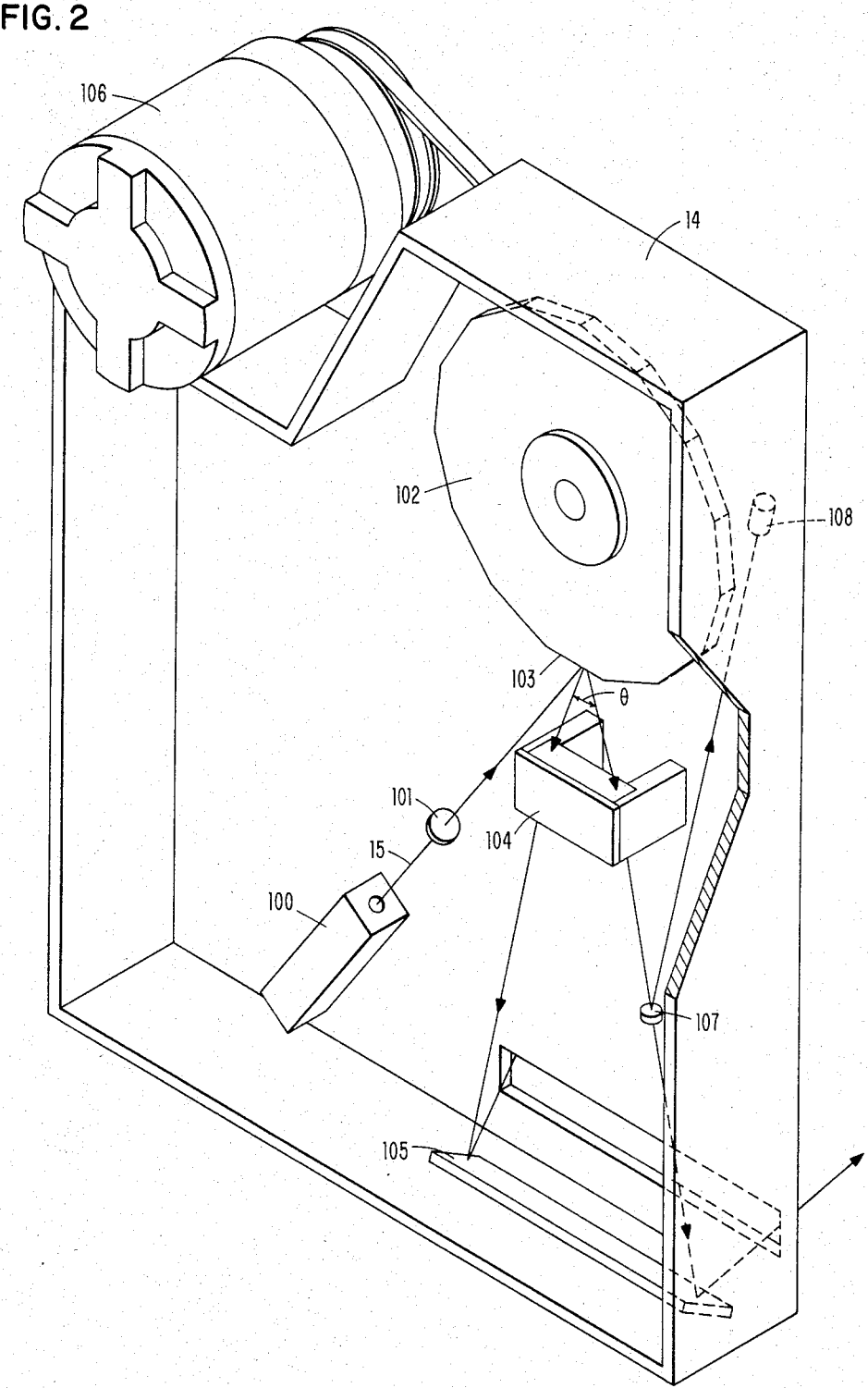
FIG. 2 is a perspective view of the optical system of the current invention which could be used in an electrophotographic machine such as that shown in FIG. 1.
Figure 3:
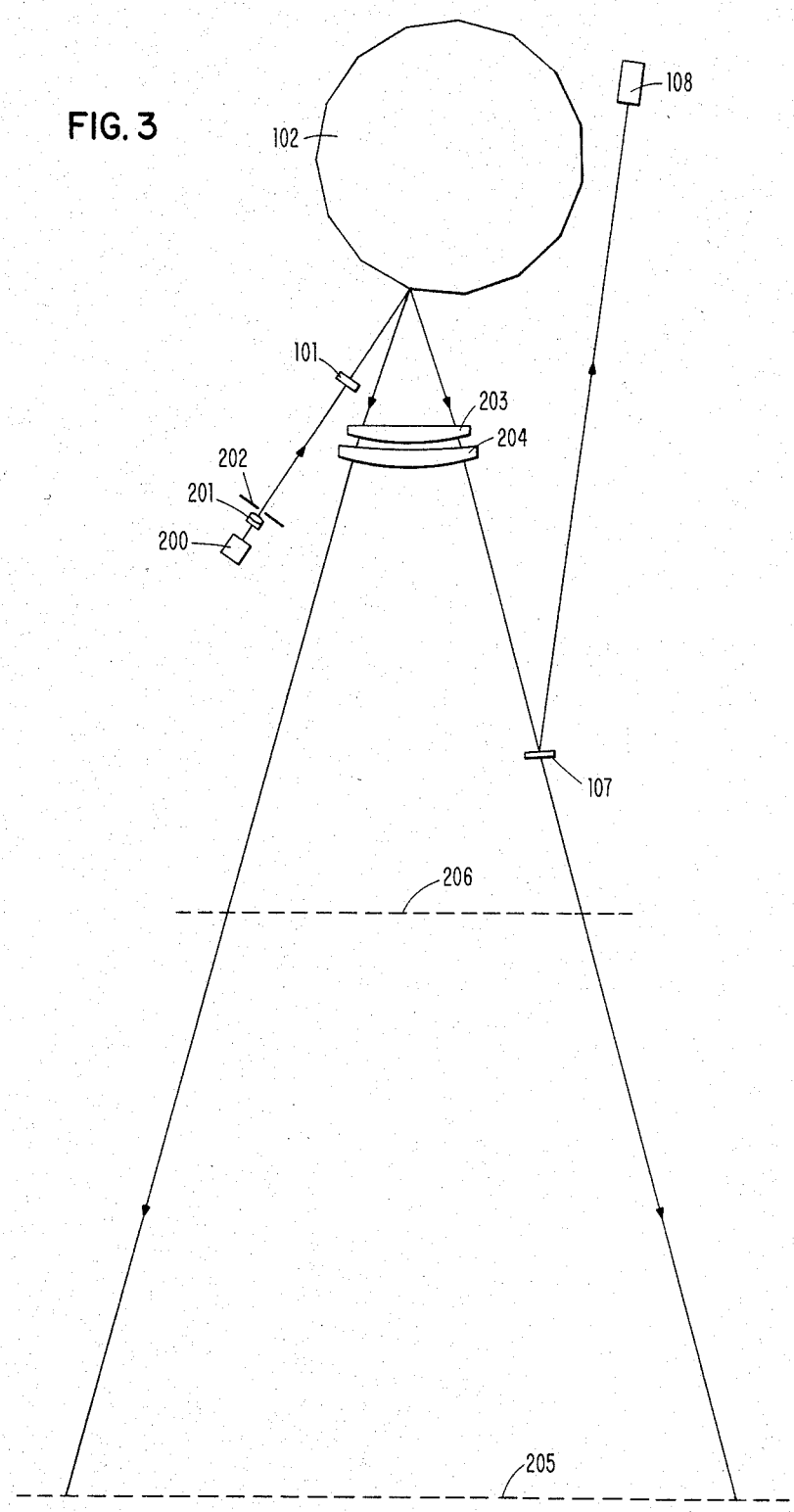
FIG. 3 shows a plan view of the optical system.

Optical system module 14 is shown in detail in FIGS. 2, 3 and 4 a semiconductor laser chip 200 and a collimating lens 201 are housed in assembly 100. Laser beam 15, produced by the laser chip 200, passes from assembly 100 through cylindrical lens 101 to a rotating mirror 102 which is produced with a plurality of facets, such as facet 103, around the periphery of the mirror. The laser beam is reflected from a single facet, such as facet 103, in such a manner as to scan through an angle θ. As each succeeding facet of rotating mirror 102 rotates into position to receive laser beam 15, another scan through the angle θ is produced. Upon reflection from the rotating mirror facet, the laser beam is passed through assembly 104 at which a toroidal lens and a spherical lens are used to finally shape the beam and to focus it upon the photoreceptive surface 12 shown in FIG. 1. It may be noted that assembly 104 could also be composed of a combination of a cylindrical and spherical lens to perform this function. A beam-fold mirror 105 is shown in both FIGS. 1 and 2 illustrating the final folding mechanism to direct the laser beam to the photoreceptive surface. Motor 106 is provided to drive the rotating mirror 102 while a start-of-scan mirror 107 is provided to direct the laser beam to a start-of-scan detector 108.

FIG. 3 illustrates a plan view of the optical system with laser beam emission from the semiconductor laser chip 200. The achromatic doublet lens 201 is placed, as an example, approximately 10 millimeters from the front plane of laser chip 200. An aperture 202 is shown positioned just beyond doublet lens 201 but can be just prior to that lens if desired. A collimated beam produced by lens 201 is passed through cylindrical lens 101 for focusing the laser onto the surface of rotating mirror 102. The beam is reflected from mirror 102 through a toroidal lens 203 and spherical lens 204 to a photoreceptive surface shown at plane 205. The plane of the beam-fold mirror 105 is shown at 206.

Figure 4A:
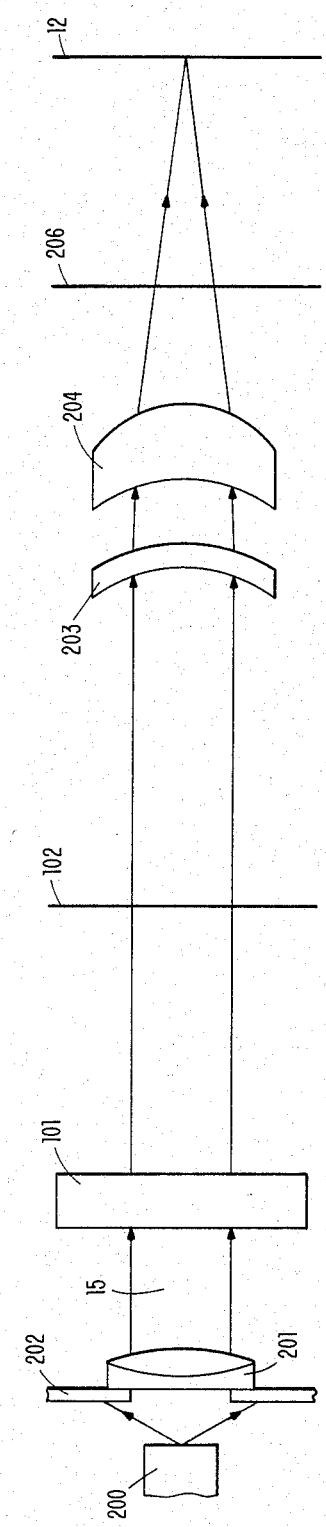
FIG. 4, comprised of FIGS. 4A and 4B, shows an unfolded line drawing of the optical system of the current invention in perpendicular planes.
Figure 4B:
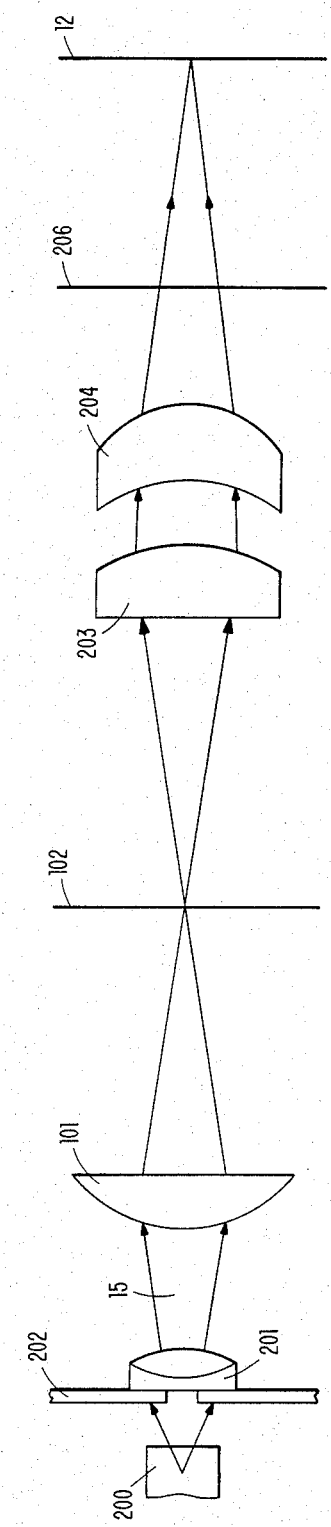

FIGS. 4A and 4B show a completely unfolded schematic representation of the optical path of the system shown in FIGS. 2 and 3. FIG. 4A shows the beam 15 in a first plane, for example, horizontal, while FIG. 4B shows the beam 15 in a second perpendicular plane, for example, vertical.

In FIG. 4A, laser chip 200 emits laser beam 15 at a relatively wide divergence angle as compared to the divergence angle shown in FIG. 4B. Correspondingly, aperture 202 contains a relatively wide opening in FIG. 4A as compared to the aperture opening shown in FIG. 4B. The elliptical shape of aperture 202 is important in compensating for the various divergence angles in the perpendicular planes to enable the production of correct spot size at the image plane. Aperture 202 also corrects for different divergence angles of emission from chip to chip thus providing an optical system which features improved assembly and service.

Note that the point of laser beam emission in FIG. 4A is at the surface of chip 200 while the point of emission in FIG. 4B is somewhat removed from the surface and appears located in the material itself. This illustrates and astigmatism which is not uncommon to semiconductor laser chips. The combination of the doublet lens 201 and aperture 202 provides a depth of focus which tends to counteract astigmatism in the formulation of leaser beam 15. An additional benefit of the greater depth of focus provided by the doublet lens and aperture is to counteract changes in the distance between the plane of laser emission and the plane of the doublet lens. Such changes may be due to variations in the temperature of the mountings of these elements.

FIGS. 4A and 4B show that the elliptical laser beam 15 is collimated in the horizontal plane but may not be fully collimated in the vertical plane. The combination of cylindrical lens 101, toroidal lens 203 and spherical lens 204 compensate for this factor and produce the desired spot size at image plane 12. Note that cylindrical lens 101 passes the collimated laser beam 15 in the horizontal plane and focuses the beam in the vertical plane to a point at or near the surface of rotating mirror 102. In that manner the laser beam appears as a line of light at the facets of mirror 102 and is reflected therefrom to toroidal lens 203 and spherical lens 204 for focusing the beam. The plane of the beam fold mirror 105 is shown at 206.

As previously mentioned, the wavelength of semiconductor laser chip 200 is subject to change as the chip ages, as it is subjected to heat, or if the need arises to replace the chip. As a result, the use of achromatic doublet lens 201 is important in order to assure that a substantial degree of insensitivity is provided to changes in wavelength. The achromatic doublet lens 201 compensates for changes in the wavelength of laser chip 200 by maintaining a relatively constant focal length despite changes in wavelength. Additionally, the use of the doublet lens 201 together with the achromatic aperture 201 provides a system for shaping the beam to the correct collimated beam size regardless of the laser divergence angle which may be emitted from laser chip 200. The achromatic doublet lens and aperture combination also provides greater depth of focus to compensate for variation in the distance between the point of laser emission and the plane of the doublet lens which may be caused by expansion of the mountings as mentioned above. Finally, the improved depth of focus helps to counteract astigmatism effects. Thus, the optical system of the instant invention provides a solution to those several problems encountered in using semiconductor laser sources in scanning systems.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An optical system in combination with a semiconductor laser light source for producing a light beam, said system being adapted to scan said eight beam produced by said source across a photoreceptive surface, comprising:
    said semiconductor laser light source for producing said light beam;
    an achromatic lens means to receive light produced by said light source and for compensating variations in the wavelength of light produced by said light source, said variations occurring over a period of time;
    reflecting means for reflecting said beam to move said beam in a scanning fashion;
    a cylindrical lens means for receiving said beam from said achromatic lens means and for focusing said beam onto the surface of said reflecting means; and
    a combination of lenses to receive said beam reflected from said reflecting means to focus said beam onto said photoreceptive surface.

2. The optical system of claim 1 wherein said achromatic lens means is a doublet and which functions to collimate said beam for transmission to said cylindrical lens.

3. The optical system of claim 2 wherein said reflecting means is a rotating mirror.

4. The optical system of claim 3 wherein said combination of lenses includes a toroidal and a spherical lens.

5. The optical system of claim 1 wherein said achromatic lens means further includes an aperture, and wherein said achromatic lens means functions to counteract astigmatism effects, functions to counteract variations in the distance between the plane of emission of said beam and the plane of said achromatic lens means, functions to counteract variations in the beam size in perpendicular planes and functions to counteract variations in the divergence angle of emission of said beam from said light source.

6. An electrophotographic printing machine comprising:
    photoreceptive material mounted on supporting means;
    motive means connected to said supporting means to cause said photoreceptive material to move in a cyclic manner;
    charge generating means for charging said photoreceptive material;
    exposure means for selectively discharging said photoreceptive material, said exposure means including a semiconductor laser chip for producing a light beam modulated according to digitized information desired for reproduction, an achromatic doublet lens and aperture means for receiving said beam from said chip and for compensating variations in wavelength of the light beam produced by said laser chip, said variations occurring over a period of time, for counteracting astigmatism effects, for counteracting variations in the distance between the plane of emission of said beam and the plane of said achromatic doublet lens and aperture means, for counteracting variations in beam size in perpendicular planes, for counteracting variations in the divergence angle of emission of said beam from said laser chip, and for collimating said light beam, a cylindrical lens means for receiving said collimated light beam and focusing said beam onto a moving reflection surface, and a combination of lenses for receiving said beam from said moving reflection surface and focusing said beam onto said photoreceptive surface such that said beam repeatedly scans across said surface to produce an image thereon;
    developing means for developing said image;
    transfer means for transferring said image to print receiving material; and
    fuser means for fusing the transferred image to said print receiving material;
    whereby a print is produced to visually reproduce that information used to modulate said beam.

* * * * *